United States Patent [19]

Dooley

[11] Patent Number: 4,763,695
[45] Date of Patent: Aug. 16, 1988

[54] COUPLING HOSE ASSEMBLY

[75] Inventor: Richard L. Dooley, Marion County, Mo.

[73] Assignee: Buckhorn Rubber Products, Inc., Hannibal, Mo.

[21] Appl. No.: 76,269

[22] Filed: Jul. 22, 1987

Related U.S. Application Data

[63] Continuation of Ser. No. 877,435, Jun. 20, 1986, abandoned.

[51] Int. Cl.⁴ .............................................. F16L 21/06
[52] U.S. Cl. ..................................... 138/109; 285/236
[58] Field of Search ........... 138/109; 24/16 R, 16 PB, 24/19, 274 R, 20 R, DIG. 11; 285/177, 420, 235, 236

[56] References Cited

U.S. PATENT DOCUMENTS

| | | | |
|---|---|---|---|
| 3,359,017 | 12/1967 | Schaub | 285/236 |
| 3,378,282 | 4/1968 | Demler | 285/177 X |
| 3,464,721 | 9/1969 | Surko | 285/177 |
| 4,059,293 | 11/1977 | Sipler | 285/236 |
| 4,172,607 | 10/1979 | Norton | 285/236 |
| 4,380,348 | 4/1983 | Swartz | 285/236 |
| 4,480,860 | 11/1984 | Foresta et al. | 285/177 |
| 4,520,952 | 6/1985 | Wahl et al. | 285/236 X |
| 4,564,220 | 1/1986 | Sills et al. | 285/236 |
| 4,583,770 | 4/1986 | Kreku et al. | 285/177 |

Primary Examiner—James E. Bryant, III
Attorney, Agent, or Firm—Senniger, Powers, Leavitt and Roedel

[57] ABSTRACT

A coupling hose assembly with a flexible hose and two clamps each bonded for only a minor portion of the length thereof to the hose, each positioned adjacent an end portion of the hose. Ridges are formed in the hose on each side of each clamp to guide each clamp as it is being tightened. The inside of the hose is provided with a circumferential bead against which the ends of tubular members can be positioned so that they are inserted sufficiently in the hose so as to be in proper registry with the clamps, thereby ensuring that when the clamps are tightened they will constrict the hose uniformly about the tubular members to produce seals therebetween.

8 Claims, 1 Drawing Sheet

COUPLING HOSE ASSEMBLY

This is a continuation of application Ser. No. 877,435, filed June 20, 1986, now abandoned.

BACKGROUND OF THE INVENTION

The present invention relates to a coupling hose and, more particularly, to a coupling hose assembly having at least one clamp for securing it in sealing engagement with a rigid tubular member received therein.

Flexible coupling hoses are used in numerous applications to join two rigid but relatively movable tubular members together for facilitating the flow of fluid therethrough, such as in a cooling system in an automobile. The hoses are designed to fit snugly on the tubular member so as to produce a seal to prevent leakage from the joint so formed. Typically a circular clamp is also applied to the end of the hose where it couples to the tubular member to ensure a fluid-tight seal where fluid flowing therethrough is under positive or negative pressure. The clamp is often a steel band with an adjusting mechanism which permits the band to be tightened about the hose so as to apply a uniform pressure about the circumference of the hose to tighten it onto the tubular member.

In an assembly line environment where many such connections are manually made, it is necessary for the worker to pre-assemble the hose and clamp, or clamps since it usually requires two clamps in such an assembly, one for each end of the hose. Coordinating the assembly of the hose and clamps and installing the assembly on the tubular members can be tedious and time consuming since each clamp must be properly aligned and held in place for tightening the hose to seal it properly around the tubular member.

SUMMARY OF THE INVENTION

The present invention overcomes the above-described difficulties and disadvantages associated with the prior art devices by providing a coupling hose assembly in which at least one clamp is secured to the hose to hold the clamp in a predetermined location along the length thereof while allowing the clamp to constrict about the circumference of the hose.

In brief the coupling hose assembly of the present invention comprises a flexible hose and at least one hose clamp having a band for circumferentially engaging the outer surface of the hose and means for securing the ends of the band together and constricting the hose for sealingly engaging the interior surface of the hose to a rigid tubular member. The band is secured to the hose for a minor portion of the band's length to hold the clamp in a predetermined location along the length of the hose while leaving a major portion of the band slidable circumferentially of the hose to tighten about the remainder of the circumference of the hose.

The assembly preferably includes two clamps spaced along the length of the hose each adjacent an end portion of the hose with each clamp being bonded for only a minor portion of its length to the outer surface of the hose. The hose is preferably formed with ridges extending circumferentially therearound on opposite sides of each band so as to guide the bands as they are tensioned and includes means internally of the hose for limiting the length of insertion of a rigid tubular member for alignment with the associated band which constricts the hose thereabout.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF A PREFERRED EMBODIMENT

The coupling hose assembly, shown generally at 10, comprises a flexible resilient cylindrical hose 12 made of an elastomer, such as a synthetic rubber material, e.g., EPDR (ethylene-propylene-diene-methylene) rubber, and a pair of hose clamps 14, preferably adjustable, each with a traversely slotted band 15 and a worm screw drive 16, which together with band 15 constitute means for securing together the ends of the band and constricting the hose. Band 15 and drive 16 are commonly made of steel, although other materials may be used. It is to be understood that other types of hose clamps are suitable, such as those with hook ends with such a length that when compressed and the hooks engaged will constrict the hose circumferentially.

Figure 3:
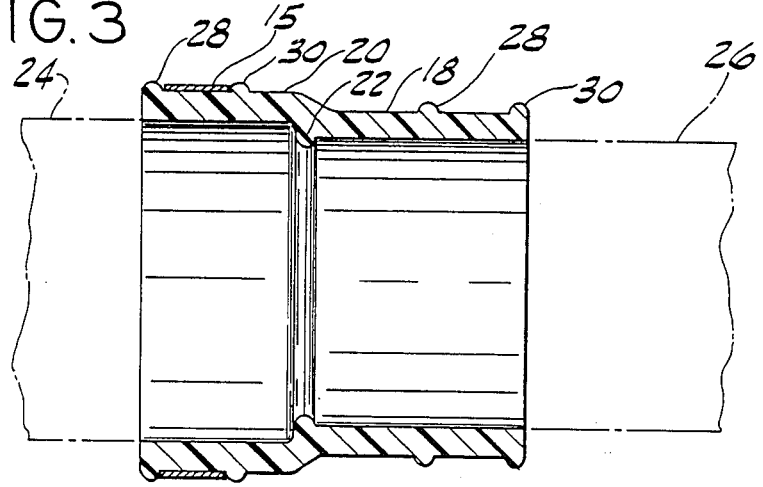
FIG. 3 is a cross sectional view of the coupling hose assembly of FIG. 1, showing in phantom the tubular members which are interconnected by a hose assembly of this invention.

Hose 12 is illustrated with one end portion 18 of smaller diameter than the other end portion 20, although it is to be understood that the hose may be of other desired contours. As shown in FIG. 3, the inside of the hose 12 is provided with a rib or bead 22 at a transition between the reduced diameter end portion 18 and the larger diameter end portion 20, against which tubular members 24 and 26 (shown in phantom) abut so that they are properly positioned in the hose 12. Rib 22 serves as means internally of the hose for limiting the depth of insertion of the tubular members so as to be in proper registry or alignment with the clamps. Tubular members 24 and 26 are, for example, an automobile radiator inlet and an engine outlet through which coolant is circulated by the engine water pump.

Each end portion 18 and 20 of the hose 12 has a pair of parallel circumferential ridges 28 and 30 extending around the hose and spaced apart the width of band 15 of clamp 14. These ridges serve as guides for the band as it is tightened so that it does not become cocked or askew on the hose which would cause it to apply uneven pressure against the hose and possibly produce a leak.

Worm screw drive 16 comprises a housing 32 secured to one end of the slotted band 15 with a worm screw 34 rotatable in the housing. The threads of screw 32 engage slots 36 in the opposite or free end of band 15 which is held captive in housing 32 and is slidable therein. As the screw is rotated band 15 is tensioned thus reducing the circumference of the band and tightening it uniformly about the hose.

In accordance with the present invention, band 15 of each clamp 14 is bonded to the hose 12 in direct engagement with the exterior surface of the base over a limited area 38, preferably adjacent housing 32. Any of many commercial adhesives are suitable for this purpose, one such being a modified cyanoacrylate ester, such as sold under the trade designation "Black Max" by the Loctite Corporation. The size or extent of the bonded area is minor in relation to the length of band 15 so that the major portion of the length of the band is disposed for direct engagement with the exterior surface of the base and is slidable circumferentially of the hose to constrict and reduce the diameter of the clamp. The area of bonding and the bond strength need only be strong enough for the clamp to remain secured to the hose during shipping, handling and application of the assembly.

Figure 1:
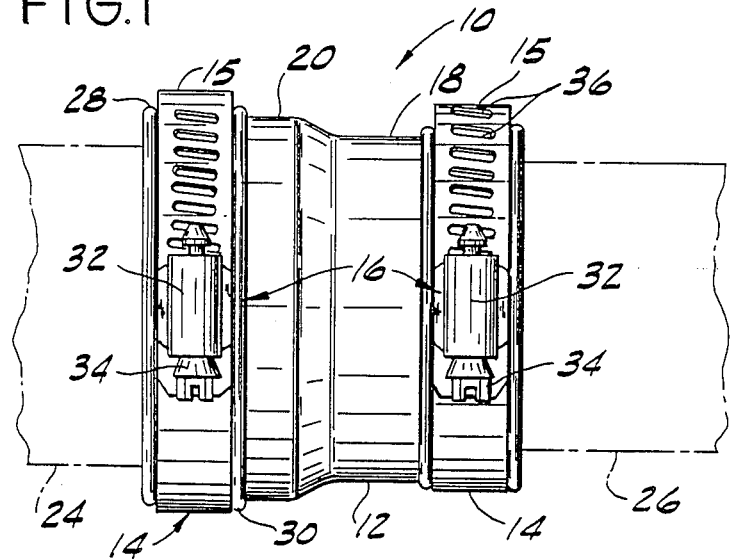
FIG. 1 is a side view of a coupling hose assembly of the present invention.
Figure 2:
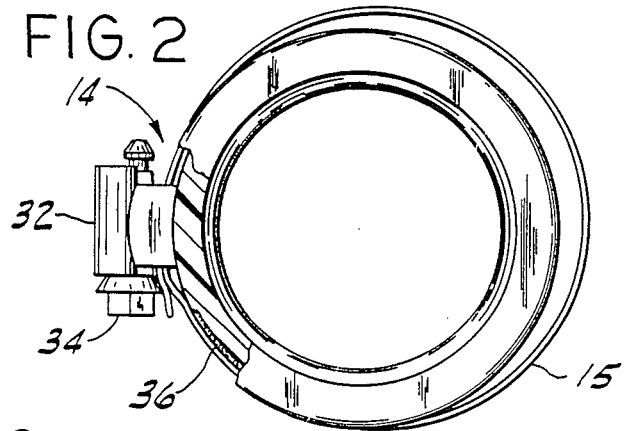
FIG. 2 is an end view in partial cross section of the hose assembly of FIG. 1, showing the location of a bond between the clamp and the hose.

The construction of the present invention provides many advantages over loose clamps used on a hose as in the past. For example, by aligning the worm screw clamp tightening mechanisms, as shown in FIG. 1, the assembly 10 is easily tightened onto the tubular members without the need to rotate the clamps on the hose while assembling it. With modern equipment, this could even be achieved without human assistance and thus lends itself to automation which was impossible with loose clamps and hoses of the prior art.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A hose and clamp assembly for quick assembly of the hose with two spaced rigid tubular members, such as an automobile radiator inlet and an automobile engine outlet, said hose comprising an elastomeric material having a pair of circular clamps thereon, one adjacent each of its ends, one end of the hose being applicable to one of said tubular members and the other end of the hose being applicable to the other with the clamp on said one end of the hose surrounding said one tubular member and the clamp on the other end of the hose surrounding the other tubular member, each clamp comprising a flexible band extending circumferentially around the hose disposed in direct engagement with an elastomeric exterior surface of the hose, means on each of the band for pulling it around the hose so as to cause the band to squeeze the hose for sealing engagement of the interior surface of the hose with the respective tubular member, each band being secured to the hose by directly bonding the inner surface of the band to the elastomeric exterior surface of the hose over a limited minor area of the band and having a major portion of its length extending from said area of securement free of the hose and disposed for direct engagement with the exterior surface of the hose, each band being adapted to be pulled around the hose by the respective pulling means independently of the other band to effect squeezing of the hose within the band without imparting any squeeze to the hose within the other band, the hose being free to flex between the bands.

2. A hose and clamp assembly as set forth in claim 1 wherein the hose is formed with ridges extending circumferentially therearound on opposite sides of each band so as to guide the bands as they are tightened.

3. A hose and clamp assembly as set forth in claim 1 including means internally of the hose for limiting the depth of insertion of each rigid tubular member for alignment with the associated band.

4. A hose and clamp assembly as set forth in claim 1 wherein the means for engaging each band for tensioning it comprises a worm screw drive and the band includes a plurality of spaced slots aligned transversely of the band.

5. A hose and clamp assembly as set forth in claim 1 for assembly with two spaced rigid tubular members of different diameters wherein the hose has end portions of different diameters, one end portion adapted to fit on on of said tubular members and the other end portion adapted to fit on the other of said tubular members, one of said bands encircling one of said end portions and adapted to be pulled tight therearound, and the other band encircling the other end portion and adapted to be pulled tight therearound.

6. A hose and clamp assembly as set forth in claim 5 wherein the hose is formed with ridges extending circumferentially therearound on opposite sides of each band so as to guide the bands as they are tightened.

7. A hose and clamp assembly as set forth in claim 5 including means internally of the hose for limiting the depth of insertion of each rigid tubular member for alignment with the associated band.

8. A hose and clamp assembly as set forth in claim 5 wherein the means for engaging each band for tensioning it comprises a worm screw drive and the band includes a plurality of spaced slots aligned transversely of the band.

* * * * *

UNITED STATES PATENT AND TRADEMARK OFFICE
CERTIFICATE OF CORRECTION

PATENT NO. : 4,763,695

DATED : August 16, 1988

INVENTOR(S) : Richard L. Dooley

It is certified that error appears in the above—identified patent and that said Letters Patent is hereby corrected as shown below:

Column 3, claim 1, lines 46-47, "means on each of the" should read --means on each band adjacent one end of the--.

Column 4, claim 5, line 29, "fit on on of said tubular" should read --fit on one of said tubular--.

Signed and Sealed this

Nineteenth Day of December, 1989

Attest:

JEFFREY M. SAMUELS

*Attesting Officer*    *Acting Commissioner of Patents and Trademarks*